Nov. 14, 1967
B. A. WEINER
3,352,762
DISINFECTANT-CONTAINING STOPPER FOR
PROLONGED AEROBIC FERMENTATIONS
Filed Aug. 10, 1964
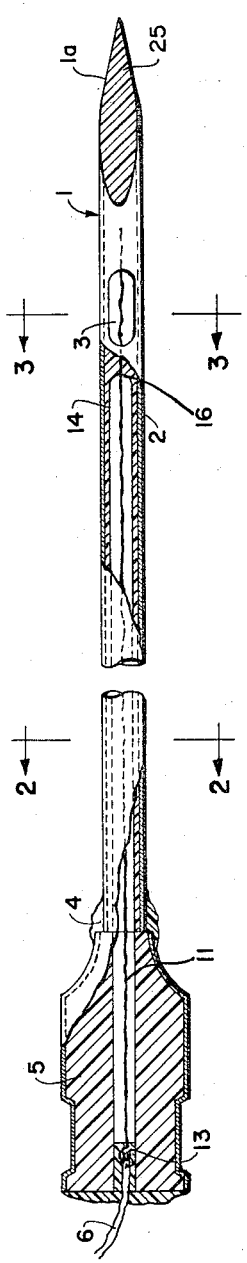
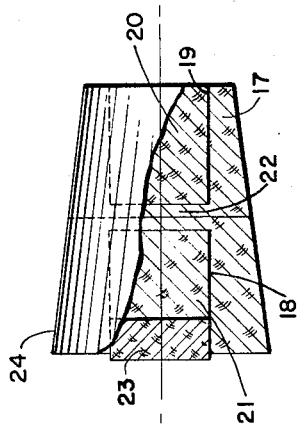
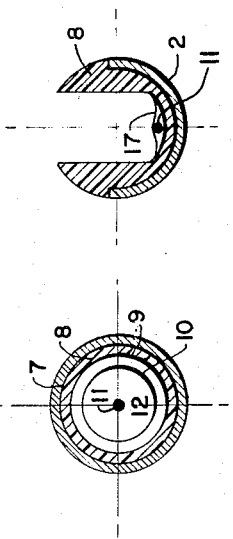
BERNARD A. WEINER
INVENTOR.
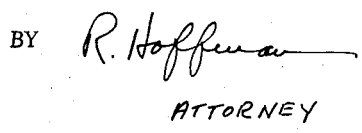
ATTORNEY

United States Patent Office

3,352,762
Patented Nov. 14, 1967

3,352,762
DISINFECTANT-CONTAINING STOPPER FOR
PROLONGED AEROBIC FERMENTATIONS
Bernard A. Weiner, Peoria, Ill., assignor to the United
States of America as represented by the Secretary of
Agriculture
Filed Aug. 10, 1964, Ser. No. 388,731
1 Claim. (Cl. 195—127)

ABSTRACT OF THE DISCLOSURE

A contamination-inhibiting puncturable s t o p p e r, through which a needle electrode may be repeatedly inserted into a fermentation vessel is made by boring a rubber stopper to provide a pair of opposing deep wells in each end separated by a puncturable membrane-like partition, filling or coating at least one of the wells with a germidicide, and then plugging the open end of that well with a puncturable plug or disc to provide a physically isolated disinfecting zone.

---

A nonexclusive, irrevocable, royalty-free license in the invention herein described, throughout the world for all purposes of the United States Government, with the power to grant sublicenses for such purposes, is hereby granted to the Government of the United States of America.

This invention relate to improved components of polarographic systems for continuously measuring the content of dissolved oxygen, e.g. in the hemolymph of undesirable insects or in fermentation media. In another aspect this invention relates to highly improved elements that cooperate to permit repetitive and self-sterilizing insertions of a protected polarographic cathode through a disinfectant-containing symmetrically-cored rubber stopper that is relatively permanently fixed in the sidewall of an oxygen-receiving bath-heated fermentation flask.

Polarographic measurement of oxygen levels in biological systems is well known. Hagihara, Biochem. Acta, 46:134 (1961), used a rotating platinum cathode for determining the oxygen uptake of the nitochondria of certain cells. Stickland, Biochem. J., 77: 636 (1960) investigated the respiration of plat nitochondria with a modification of the Clark cathode, see Trans. Am. Soc. for Artificial Internal Organs, 21: 41 (1955), the Clark electrode comprising a platinum wire encased in a membrane-tipped glass capillary anchored in a KCl solution also containing a silver wire anode; Kreuzer et al., Jour. Appl. Physiol., 15: 77 (1960), continuously recorded intra-carotid oxygen levels with a modified Clark platinum electrode contained in a catheter-type sheath, the built-up rounded tip being incapable of puncturing tissue and requiring either direct incisional access or the use of a trocar. It is also old to prepare extremely thin salt bridge electrodes for obtaining the millivolt discharges from single cells of the exposed cerebral cortex with meticulously drawn out capillary tubes, but even with the utmost manipulative care and access to such a particularly soft tissue as the brain, the rate of breakage is most troublesome.

The present invention is the outgrowth of problems encountered in research directed towards the metabolism of the Japanese bettle larvae and particularly towards enhancing the in vivo and in ivtro production, viability, and pathogenicity of *Bacillus popilliae* spores that could be a most valuable means of controlling or eradicating the Japanese beetle. It was found that while the mere miniaturization of sheath-reinforced prior art polarographic cathodes rendered them small enough for placement in the hemocoel of the Japanese bettle larva, cathodes having a bulbous tip, as in Kreuzer et al., excessively traumatized the larvae thereby unduly increasing their metabolism and hastening their deaths so that extended readings could not be obtained. When the platinum wire was simply ensheathed in a 27 gauge hypodermic needle, the beveled terminal aperture of the needle accumulated cellular debris and plugs that markedly interfered with the readings. Furthermore, sheath-reinforced polarographic cathodes having dulled or rounded rather than apex-type points obviously could not be thrust into contamination-protected glassware such as rubber-stoppered fermentation flasks nor through the remaining layer of rubber when the stopper has been deeply bored out from both ends to provide opposed cup-like recesses at least one of which recesses contains a vaporizable disinfectant or sterilant. This is especially true when the free end of the sterilant-containing recess is also fitted with a tightly fitting puncturable plug or stopper that will effectively prevent the loss of vaporizable sterilant, e.g., crystals and vapor of iodine, and also prevents such from reaching the sensitive culture medium.

One object of the invention is to provide a hypodermic needle-ensheathed, highly sensitive polarographic electrode that can be employed on insects.

Another object is to provide a sheath-reinforced platinum wire electrode structure that is capable of being repeatedly thrust through relatively resistant materials without thereby acquiring sensitivity-diminishing occlusions of the aperture and the space immediately surrounding the functionally exposed portion of the platinum cathode.

Still another object is to provide a bilaterally bored rubber stopper in which the thusly formed opposing recesses or wells are separated by a membrane-like, puncturable partition of remaining rubber, the recess, preferably of the less highly tapered external portion of the stopper, containing a volatile or sublimable disinfectant and terminally therein also a punctural, closely fitting stopper or plug to prevent contamination of a prolonged fermentation by bacterial seepage from an externally situated constant temperature bath (which protective function is conventionally served by a "steam trap") or to keep the disinfectant from reaching a sensitive medium, whereby air-borne contamination of an entering needle or electrode is overcome, thereby avoiding spoilage of a fermentation or culture being studied.

A specific object of providing the apparatus of the present invention is to facilitate the determination of dissolved oxygen tensions in studies on fermentations of *Bacillus popilliae* and on the metabolism of Japanese beetle larvae infected therewith which may provide the key to the successful fermentative propagation of the very large populations of *B. popilliae* spores that are required for initiating the desired lethal form of Japanese beetle milky disease, which to date has been induced only to the extent possible with the limited availability of costly powdered whole tissue from laboriously collected naturally infected Japanese beetles.

The above and related objects will be made clearer by reference to the following specification and drawings.

Attempts to employ suitably miniaturized catheter-type (ensheathed) polarographic electrodes that resisted polarization and that would remain highly sensitive and accurate despite successive penetrations of a multiplicity of Japanese beetle larvae were unsatisfactory until the open tip of the ensheathing protective 27 guage hypodermic needle was closed with a hardenable resin and a corresponding opening created in the shaft of the needle only very slightly above the former opening in the bevel of the needle, thus avoiding the formation and deposit of interfering solid materials such as exoskeleton, body tissue, or rubber particles or plugs produced during the physical penetrations by the rigidity-conferring hypodermic needle.

My modified polarographic electrode, hereinafter more fully described, is not limited to the relatively atraumic use in insects, but is also particularly valuable for multiple re-introductions into a contamination-susceptible oxygenated fermentation system through a novel rubber stopper subassembly. In this subassembly, the outer member of a pair of cup-like recesses formed by deeply boring a rubber stopper from each end, is filled or coated with a germicide such as phenol or painted with ethanolic KI solution containing undissolved crystals of iodine, and the exposed end of the thusly treated recess is then plugged with a puncturable plug or disc of suitable size whereby to provide a physically isolated disinfecting zone for preventing contamination while permitting the electrode to be periodically withdrawn for standardization or to permit other fermentation requirements followed by sterile reinsertion, instead of interrupting the electrical continuity of the electrode at the hub of the needle.

Referring now to the drawings:

FIGURE 1 is a partially cut away view of my improved polarographic cathode;

FIGURE 2 is an enlarged cross section of the polarographic cathode, taken on line 2—2 of FIGURE 1;

FIGURE 3 is a cross section of the electrode taken on line 3—3 of FIGURE 1; and

FIGURE 4 is a side elevation, partly in section of the stopper.

Referring to FIGURE 1, it will be seen that the polarographic cathode comprises a hypodermic needle 1 in which the original aperture of the bevel 1a has been smoothly filled with a hardenable liquid resin 25 to completely obliterate the exposed opening. Along the tubular shaft 2 of the needle, slightly but distinctly beyond the area of the bevel and in a plane corresponding therewith, is a small longitudinal slit 3 which has been created to substitute for the now sealed opening at the bevel to provide a nonplugging communication with the hollowed interior (not shown) of the tubular shaft. A collar 4 of a hardenable resin reinforces and positively seals the junction of the shaft with needle hub 5 wherein cathode external lead wire 6 connects with the platinum wire cathode 11. The platinum cathode extending beyond the fused end 16 of the glass capillary is enclosed within a film or membrane 17 of collodion through which diffuses the oxygen present in the fluid bathing the platinum cathode from adjacent slit 3. The membrane enveloped portion of the cathode rests on a cementing matrix of resin and, optionally for easier placement, may terminate in a very short section of glass capillarly tube, not shown.

Referring to FIGURE 2, it can be seen that wall 7 of the tubular shaft of hypodermic needle 1 is separated by an insulating layer 8 of hardened resin from the outer surface 9 of glass capillary tube 10 containing a platinum wire cathode 11 that is surrounded by space 12 containing dehumidified air, the platinum wire through soldered connection 13 being electrically continuous with external lead 6, the physical relationships of the said electrode, glass capillary, soldered connection, and the external lead all being rigidly maintained and sealed within needle hub 5 by a hardened resin as further seen from FIGURE 3, platinum cathode 11 within collodion membrane 17 is anchored to insulating resin 8 which lines apertured shaft 2.

The stopper subassembly, which is the specific subject of this application, comprises a rubber stopper 24 in which 18 and 19 are thick vertical walls defining respective deep wells or recesses 20 and 21 separated from one another by a membrane-like intact segment 22. At least one of the said wells containing a disinfectant such as a sublimable form of iodine, and in sealing relationship, to the open end of a disinfectant-containing well, a tightly fitting puncturable plug 23 is inserted whereby escape of the disinfectant is prevented.

It will be appreciated that my improved polarographic cathode can be used with a conventional calomel anode (not shown) that completes a circuit through a KCl bridge (also not shown).

As previously indicated, my novel cathode is uniquely useful when used for substantially continuously recording the dissolved oxygen tensions of extremely prolonged fermentations (at least several months duration) where the conventional "steam trap" protected side opening of the flash does not permit polarography and where my novel stopper prevents seepage contamination otherwise arising from prolonged exposure of the fermentation vessel to the constant temperature bath in which it rests.

Having described my inventive contributions I claim:

A contamination-inhibiting, repeatedly puncturable stopper assembly for receiving a periodically removed and replaced needle-like electrode, said assembly comprising:

(a) a puncturable stopper having a pair of opposing deep wells bored from each end for containing a sterilant in at least one of said wells;

(b) a puncturable, membrane-like partition separating said wells;

(c) a vaporizable sterilant in one of said wells and (d) a tightly-fitting, puncturable member inserted in and closing the well containing the sterilant.

References Cited

UNITED STATES PATENTS 1,413,703   4/1922   Biehn _____ 215—47

ALVIN E. TANENHOLTZ, *Primary Examiner.*